US009256494B2

(12) United States Patent
Lee et al.

(10) Patent No.: US 9,256,494 B2
(45) Date of Patent: Feb. 9, 2016

(54) MEMORY SYSTEM AND OPERATING METHOD THEREOF

(71) Applicant: SK hynix Inc., Icheon-si Gyeonggi-do (KR)

(72) Inventors: Hyun Ju Lee, Chungcheongbuk-do (KR); Seok Hwan Choi, Yongin-si (KR)

(73) Assignee: SK Hynix Inc., Gyeonggi-do (KR)

( * ) Notice: Subject to any disclaimer, the term of this patent is extended or adjusted under 35 U.S.C. 154(b) by 87 days.

(21) Appl. No.: 14/177,970

(22) Filed: Feb. 11, 2014

(65) Prior Publication Data
US 2015/0100849 A1    Apr. 9, 2015

(30) Foreign Application Priority Data
Oct. 7, 2013   (KR) .......................... 10-2013-0119354

(51) Int. Cl.
*G06F 11/10* (2006.01)
(52) U.S. Cl.
CPC .................................. *G06F 11/1048* (2013.01)
(58) Field of Classification Search
CPC .................................................. G06F 11/1076

USPC ...................... 714/764, 767, 769; 365/185.03
See application file for complete search history.

(56) References Cited

U.S. PATENT DOCUMENTS

| | | | |
|---|---|---|---|
| 7,266,168 B2 * | 9/2007 | Kwak et al. ................... | 375/347 |
| 8,126,029 B2 * | 2/2012 | Elias ............................. | 375/140 |
| 2010/0232221 A1* | 9/2010 | Park et al. ................ | 365/185.03 |
| 2015/0019886 A1* | 1/2015 | Lim .............................. | 713/310 |

FOREIGN PATENT DOCUMENTS

| | | |
|---|---|---|
| KR | 1020100075958 A | 7/2010 |
| KR | 1020110099566 A | 9/2011 |

* cited by examiner

*Primary Examiner* — Fritz Alphonse
(74) *Attorney, Agent, or Firm* — William Park & Associates Ltd.

(57) ABSTRACT

A memory system and an operating method thereof are provided. The memory system includes a semiconductor memory device configured to perform a read operation and a controller configured to control the read operation of the semiconductor memory device, and the controller, by determining programmed states of memory cells located nearby selected memory cells, divides the selected memory cells into a plurality of groups depending on an amount of interference, and corrects data of one of the groups having a great amount of interference.

20 Claims, 7 Drawing Sheets

MEMORY SYSTEM AND OPERATING METHOD THEREOF

CROSS-REFERENCE TO RELATED APPLICATION

The present application claims priority to Korean patent application number 10-2013-0119354 filed on Oct. 7, 2013, in the Korean Intellectual Property Office, the entire disclosure of which is incorporated by reference herein.

BACKGROUND

1. Technical Field

The present invention relates to a memory system and an operating method thereof. More specifically, the present invention relates to a memory system in which precise data is read, and an operating method thereof.

2. Related Art

A semiconductor memory is a memory device implemented using a semiconductor, such as silicon (Si), germanium (Ge), gallium arsenide (GaAs), indium phosphide (InP), etc. The semiconductor is mainly divided into a volatile memory and a nonvolatile memory.

The volatile memory is a memory device which loses stored data when power is interrupted. Examples of the volatile memory include a static random access memory (SRAM), a dynamic RAM (DRAM), a synchronous DRAM (SDRAM), etc. The nonvolatile memory is a memory device which maintains stored data even when power is interrupted. Examples of the nonvolatile memory include a read only memory (ROM), a programmable ROM (PROM), an electrically programmable ROM (EPROM), an electrically erasable programmable ROM (EEPROM), a flash memory, a phase-change RAM (PRAM), a magnetic RAM (MRAM), a resistive RAM (RRAM), a ferroelectric RAM (FRAM), etc. The flash memory is mainly divided into a NOR type flash memory and a NAND type flash memory.

FIG. 1A is a view illustrating a programming operation of 2 bit data in a nonvolatile memory device.

The following description will be made on the assumption that a programming operation is performed in an incremental step pulse programming (ISPP) method. The ISPP method repeatedly performs a programming operation on memory cells by gradually increasing a program voltage, so that the threshold voltage distribution of a memory cell is precisely controlled.

As for a nonvolatile memory device, 1 bit or 2 bit of data may be stored in a single memory cell depending on the demand of a user. In a case that 1 bit data is stored, the memory cells may be divided into a memory cell having a threshold voltage lower than 0 V and a memory cell having a threshold voltage higher than 0 V depending on data stored in the memory cells. In a case that 2 bit data is stored, the memory cells may be divided into a first memory cell having a threshold voltage lower than 0, and second to fourth memory cells each having a different threshold voltage higher than 0 V.

Referring to FIG. 1A, a programming operation includes a first process of programming a least significant bit and a second process of programming a most significant bit. In the first process, a program voltage having a great increase rate is used in order to increase the programming operation speed. Accordingly, the state of a memory cell is changed from an erased state '11' into a programmed state '10'. Since a program voltage having a great increase rate is used, the programmed cell has a wide threshold voltage distribution.

The second process of programming a most significant bit is divided depending on the state of a least significant bit and a bit stored as a most significant bit. First, a cell to store a most significant bit of '1' among cells having a least significant bit of '1' (that is, an erased state) is not subject to a programming operation. On the other hand, a cell to store a most significant bit of '0' among cells having a least significant bit of '1' (that is, an erased state) is programmed in a '01' state.

In addition, a cell to store a most significant bit of '1' among cells having a least significant bit of '0' (that is, a programmed state) is programmed as in a '10' state, and a cell to store a most significant bit of '0' among cells having a least significant bit of '0' (that is, a programmed state) is programmed in a '00' state.

FIG. 1B is a view illustrating a program sequence of most significant bit data and least significant bit data of 2 bit data.

Referring to FIG. 1B, first, a memory cell connected to an even bit line BLe and a first word line WL0 is programmed using least significant bit LSB data (0). Thereafter, a memory cell connected to an odd bit line BLo and the first word line WL0 is programmed using LSB data (1). Thereafter, a memory cell connected to the even bit line BLe and a second word line WL1 is programmed using LSB data (2). Thereafter, a memory cell connected to the odd bit line BLo and the second word line WL1 is programmed using LSB data (3). Thereafter, a memory cell connected to the even bit line BLe and the first word line WL0 is programmed using most significant bit MSB data (4). Thereafter, a memory cell connected to the odd bit line BLo and the first word line WL0 is programmed using MSB data (5). At this time, a programming operation on the memory cell connected to the first word line WL0 is completed, and such a programming operation is repeatedly performed in the same manner.

However, when a programming operation is performed in this manner on memory cells connected adjacent word lines or bit lines, interference in a bit line direction and a word line direction may change the threshold voltage distribution of memory cells. Accordingly, each memory cell has a different change in threshold voltage depending on the programmed state of nearby memory cells, and thus wrong data may be read at a read operation of a nonvolatile memory device.

SUMMARY

The present invention is directed to a memory system in which precise data is read, and an operating method thereof.

An embodiment of the present invention provides a memory system including: a semiconductor memory device configured to perform a read operation; and a controller configured to control the read operation of the semiconductor memory device, wherein the controller, by determining programmed states of memory cells located nearby selected memory cells, divides the selected memory cells into a plurality of groups depending on an amount of interference, and corrects data of one of the groups having a great amount of interference.

An embodiment of the present invention provides a memory system including: a memory cell array including a plurality of memory cells; a periphery circuit unit configured to read data stored in the plurality of memory cells; and a controller configured to correct data read from selected memory cells based on data of nearby memory cells.

An embodiment of the present invention provides a method of operating a memory system including: reading data of selected memory cells; reading data of nearby memory cells adjacent to the selected memory cells; dividing the selected memory cells into a plurality of groups based on the data of the nearby memory cells; dividing memory cells included in a data correction region; and correcting data read from memory cells included in the data correction region and determined to have a greatest amount of interference caused by the nearby memory cells.

An embodiment of the present invention provides a computing system comprising: a system bus; and a memory system electrically coupled to the system bus, wherein the memory system comprises: a semiconductor memory device configured to perform a read operation; and a control configured to control the read operation of the semiconductor memory device, wherein the controller, by determining programmed states of memory cells located nearby selected memory cells, divides the selected memory cells into a plurality of groups depending on an amount of interference, and corrects data of one of the groups having a great amount of interference.

BRIEF DESCRIPTION OF THE DRAWINGS

The above and other features and advantages of the present invention will become more apparent to those of ordinary skill in the art by describing in detail various embodiments thereof with reference to the attached drawings in which.

DETAILED DESCRIPTION

The present invention will be described more fully hereinafter with reference to the accompanying drawings, in which various embodiments of the invention are shown. This invention may, however, be embodied in different forms and should not be construed as limited to the embodiments set forth herein.

In the description of the present invention, it will be understood that, when a part is referred to as being "connected" to another part, it can be "directly connected" to the other part or "indirectly connected" to the other part while intervening one or more elements therebetween. In the description of the present invention, it will be understood that, when a part includes/comprises an element, another element is not excluded but further included as long as an opposite statement is not made.

Figure 2:
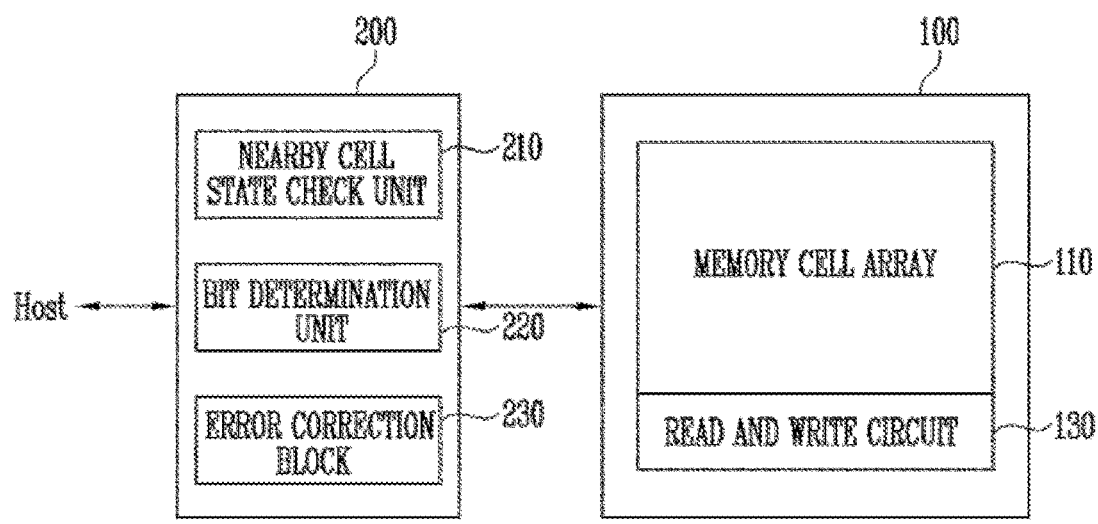
FIG. 2 is a block diagram illustrating a memory system according to the present invention.

FIG. 2 is a block diagram illustrating a memory system according to the present invention.

Referring to FIG. 2, a memory system 10 includes a semiconductor memory device 100 and a controller 200. The semiconductor memory device 100 includes a memory cell array 110 and a read and write circuit 130 electrically coupled to the memory cell array 110.

The memory cell array 110 includes a plurality of memory cells. Each of the plurality of memory cells may be defined as a multi-level memory cell storing two or more data bits.

The semiconductor memory device 100 operates in response to control of the controller 200. The semiconductor memory device 100, upon receiving a read command from the controller 200, is configured to perform a read operation on memory cells (selected memory cells) indicated by an address received together with the command. In this case, the semiconductor memory device 100 reads data of nearby memory cells adjacent to the memory cells selected during the read operation, and transmits the read data of the nearby memory cells to the controller 200. That is, the semiconductor memory device 100 transmits most significant bit (MSB) data and least significant bit (LSB) data of the read nearby memory cells. In this case, the nearby memory cells adjacent to the selected memory cell include cells adjacent to the selected memory cell in a direction of a left bit line to a right bit line and a cell adjacent to the selected memory cell in a word-line-to-word-line direction and programmed next to the selected memory cell. That is, data of three nearby memory cells based on one selected memory cell is transmitted to the controller 200. As a result, data of nearby memory cells exerting the greatest influence during a programming operation is transmitted and used for a data correction operation which will be described later.

According to an embodiment of the present invention, the semiconductor memory device 100 may be a flash memory device. However, the technical embodiment of the present invention is not limited to the flash memory device.

The controller 200 is electrically coupled between the semiconductor memory device 100 and a host. The controller 200 is configured to interface between the host and the semiconductor memory device 100. For example, during a read or programming operation according to a request from the host, the controller 200 may convert a logical block address received from the host into a physical block address, and provide the semiconductor memory device 100 with the converted physical block address together with the command. In addition, the controller 200 analyzes the programmed states of the nearby memory cells received from the semiconductor memory device 100 to group the selected memory cells into a plurality of groups depending on an amount of interference of nearby memory cells exerted on the selected memory cells during the read operation, selects a group having a great amount of interference among the plurality of groups, and inverses read data of memory cells whose threshold voltages are included in a data correction region among memory cells included in the selected group so as to correct the data. The controller 200 may also correct data of one of the groups having a great amount of interference.

According to an embodiment of the present invention, the controller 200 includes a nearby cell state check unit 210, a bit determination unit 220, and an error correction block 230.

The nearby cell state check unit 210 temporarily stores data of nearby memory cells received from the semiconductor memory device 100, analyzes an amount of interference exerted on the selected memory cells based on the stored data, and groups the selected memory cells into a plurality of groups based on the amount of interference.

The bit determination unit 220 selects one group determined to have a great amount of interference among the plurality of memory cell groups grouped by the nearby cell state check unit 210, and inverses read data of memory cells whose threshold voltages are included in a data correction region among memory cells included in the selected group so as to correct the data. In addition, a data correction operation on memory cells included in the remaining groups except the selected group is skipped.

The error correction block 230 is configured to perform an error detection and correction of read data of the memory cells having been subject to the data correction operation by the bit determination unit 220 and the memory cells skipped from the data correction operation. An error correction function performed by the error correction block 230 is limited by the number of error bits of the read data. If the number of error bits of the read data is below a predetermined value, the error correction block 230 performs an error detection and correction function. If the number of error bits of the read data exceeds a predetermined value, error detection and correction is not performed. When the error detection and correction is not performed, the controller 200 controls the semiconductor memory device 100 to adjust a read voltage applied to a selected word line. Accordingly, the semiconductor device 100, during the read operation, may read data of the selected memory cells by use of a read voltage and transmit the read data to the controller 200; and after changing the read voltage by an amount corresponding to a data correction region, read again the data of the selected memory cells and transmit the re-read data to the controller 200.

Figure 3:
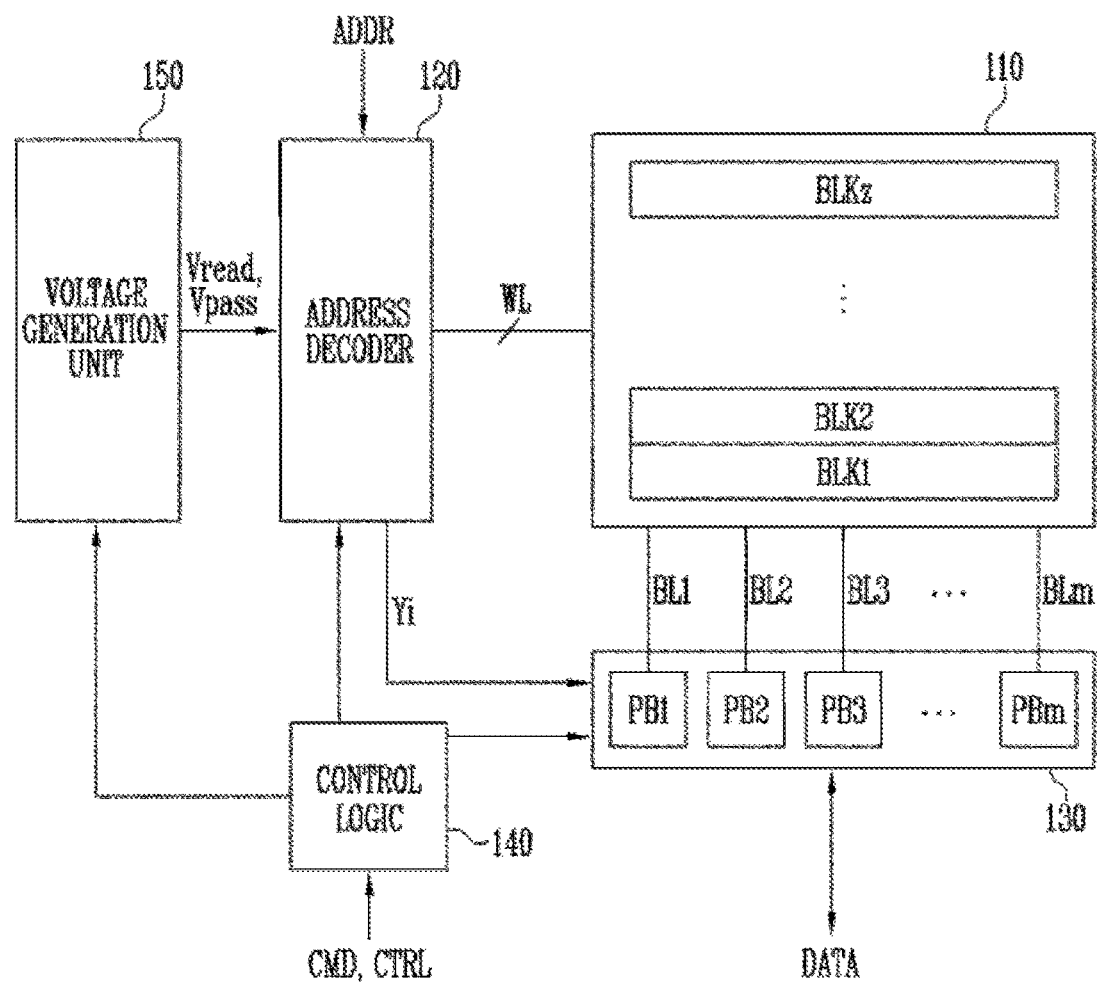
FIG. 3 is a detailed block diagram illustrating a semiconductor memory device of FIG. 2.

Referring to FIG. 3, the semiconductor memory device 100 includes the memory cell array 110, an address decoder 120, the read and write circuit 130, a control logic 140, and a voltage generation unit 150.

The memory cell array 110 includes a plurality of memory blocks BLK1 to BLKz. The plurality of memory blocks BLK1 to BLKz are electrically coupled to the address decoder 120 through word lines WL. The plurality of memory blocks BLK1 to BLKz are electrically coupled to the read and write circuit 130 through bit lines BL1 to BLm. Each of the plurality of memory blocks BLK1 TO BLKz includes a plurality of memory cells. According to an embodiment of the present invention, the plurality of memory cells represent nonvolatile memory cells. In addition, each of the plurality of memory blocks BLK1 to BLKs includes a plurality of memory cells electrically coupled to the word lines WL, and memory cells among the plurality of memory cells electrically coupled to a single word line are defined into an even page and an odd page. That is, memory cells electrically coupled to even bit lines among memory cells electrically coupled to a single word line is defined as an even page, and memory cells electrically coupled to odd bit lines among the memory cells electrically coupled to the single word line is defined as an odd page.

The address decoder 120, the read and write circuit 130, and the voltage generation unit 150 operate as a periphery circuit driving the memory cell array 110. In addition, the address decoder 120, the read and write circuit 130, and the voltage generation unit 150 may operate as a periphery circuit configured to read data of the selected memory cells and data of nearby memory cells, and transmit read data to the controller 200.

Figure 1A:
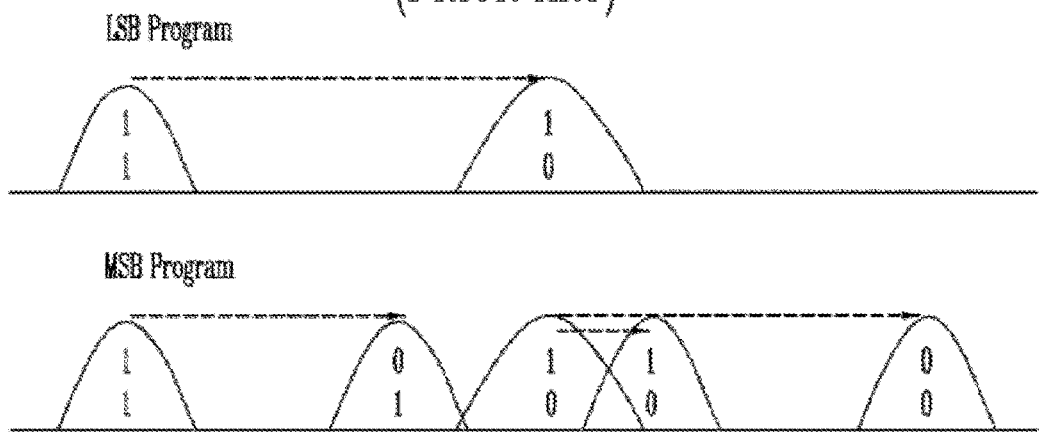
FIG. 1A is a view illustrating a programming operation of 2 bit data in a general nonvolatile memory device.
Figure 1B:
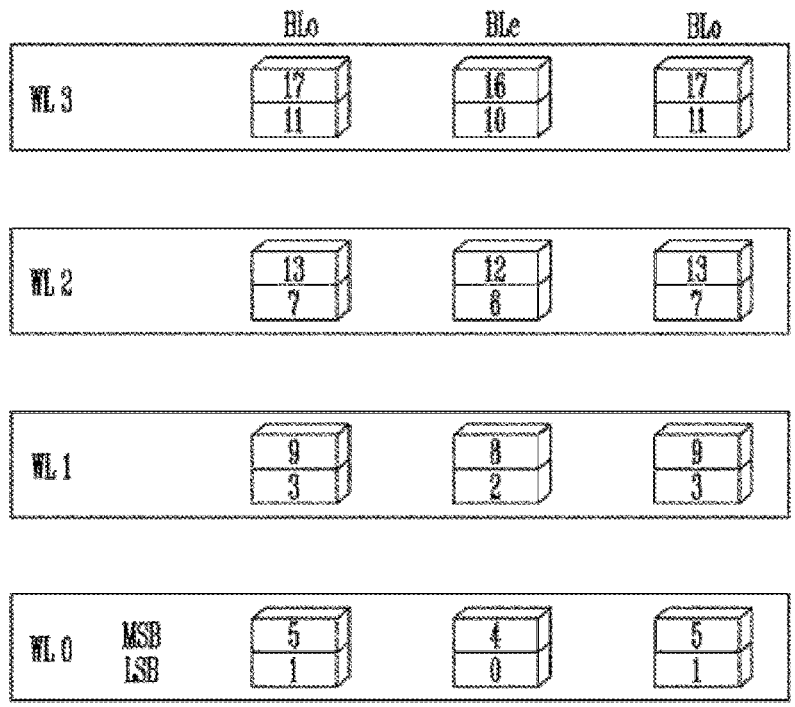
FIG. 1B is a view illustrating a programming sequence of least significant bit data and most significant bit data of 2 bit data.

The address decoder 120 is electrically coupled to the memory cell array 110 through the word lines WL. The address decoder 120 is configured to operate in response to the control of the control logic 140. The address decoder 120 receives an address ADDR through an input/output buffer (not shown) inside the semiconductor memory device 100. The address ADDR is received from the controller (200 in FIG. 1).

The address decoder 120, during a read operation, is configured to decode a row address among the received addresses ADDR, and apply a read voltage a Vread generated by the voltage generation unit 150 to a word line selected among the plurality of word lines WL based on the decoded row address, and apply a pass voltage to the remaining unselected word lines.

The address decoder 120 is configured to decode a column address among the received addresses ADDR. The address decoder 120 transmits a decoded column address Yi to the read and write circuit 130.

The read operation and the programming operation of the semiconductor memory device 100 are performed in units of pages. The address ADDR received upon a request of a read operation and a programming operation, includes a block address, a row address, and a column address. The address decoder 120 selects a single memory block and a single word line according to the block address and the row address. The column address is decoded by the address decoder 120, and provided to the read and write circuit 130.

The address decoder 120 may include a block decoder, a row decoder, a column decoder, and an address buffer.

The read and write circuit 130 includes a plurality of page buffers PB1 to PBm. The plurality of page buffers PB1 to PBm are electrically coupled to the memory cell array 110 through the bit lines BL1 to BLm. The plurality of page buffers PB1 to PBm each read data of a memory cell selected from the memory cell array 110 during a read operation by use of the read voltage Vread, and transmit the read data to the controller (200 in FIG. 1). In addition, each of the plurality of page buffers PB1 to PBm reads data of nearby memory cells after reading the selected memory cell, and transmits the read data to the controller (200 in FIG. 1). The nearby memory cells include memory cells adjacent to the selected memory cell in direction of a left bit line to a right bit line and a memory cell adjacent to the selected memory cell in a word-line-to-word-line direction and programmed next to the selected memory cell. That is, data of three nearby memory cells based on a single selected memory cell is transmitted to the controller 200.

The read and write circuit 130 operates in response to the control of the control logic 140.

According to an embodiment of the present disclosure, the read and write circuit 130 may include page buffers (or page registers) and a column select circuit.

The control logic 140 is electrically coupled to the address decoder 120, the read and write circuit 130, and the voltage generation unit 150. The control logic 140 receives a command CMD and control signal CTRL through the input/output buffer (not shown) of the semiconductor memory device 100. The command CMD is provided from the controller 200 (see FIG. 1). The control logic 140 is configured to control overall operations of the semiconductor memory device 100 in response to the command CMD. The control logic 140 may be configured to control the periphery circuit that includes the decoder 120, the read and write circuit 130 and voltage generation unit 150 to perform the read operation according to the control of the controller 200.

The voltage generation unit 150 generates a read voltage Vread and a pass voltage Vpass during a read operation. The voltage generation unit 150 may adjust an electric potential level of the read voltage Vread generated according to the control of the control logic 140. Moreover, the voltage generation unit 150 may change the read voltage Vread to a value of the data correction region by raising and lowering the read voltage Vread according to control of the control logic 140. In addition, the address decoder 120, the read and write circuit 130, and the voltage generation unit 150 operating as a periphery circuit may read data of the selected memory cells by use of the read voltage Vread and transmit the read data to the controller 200; and after changing the read voltage Vread by an amount corresponding to a data correction region, read again the data of the selected memory cells and transmit the re-read data to the controller 200.

Figure 4:
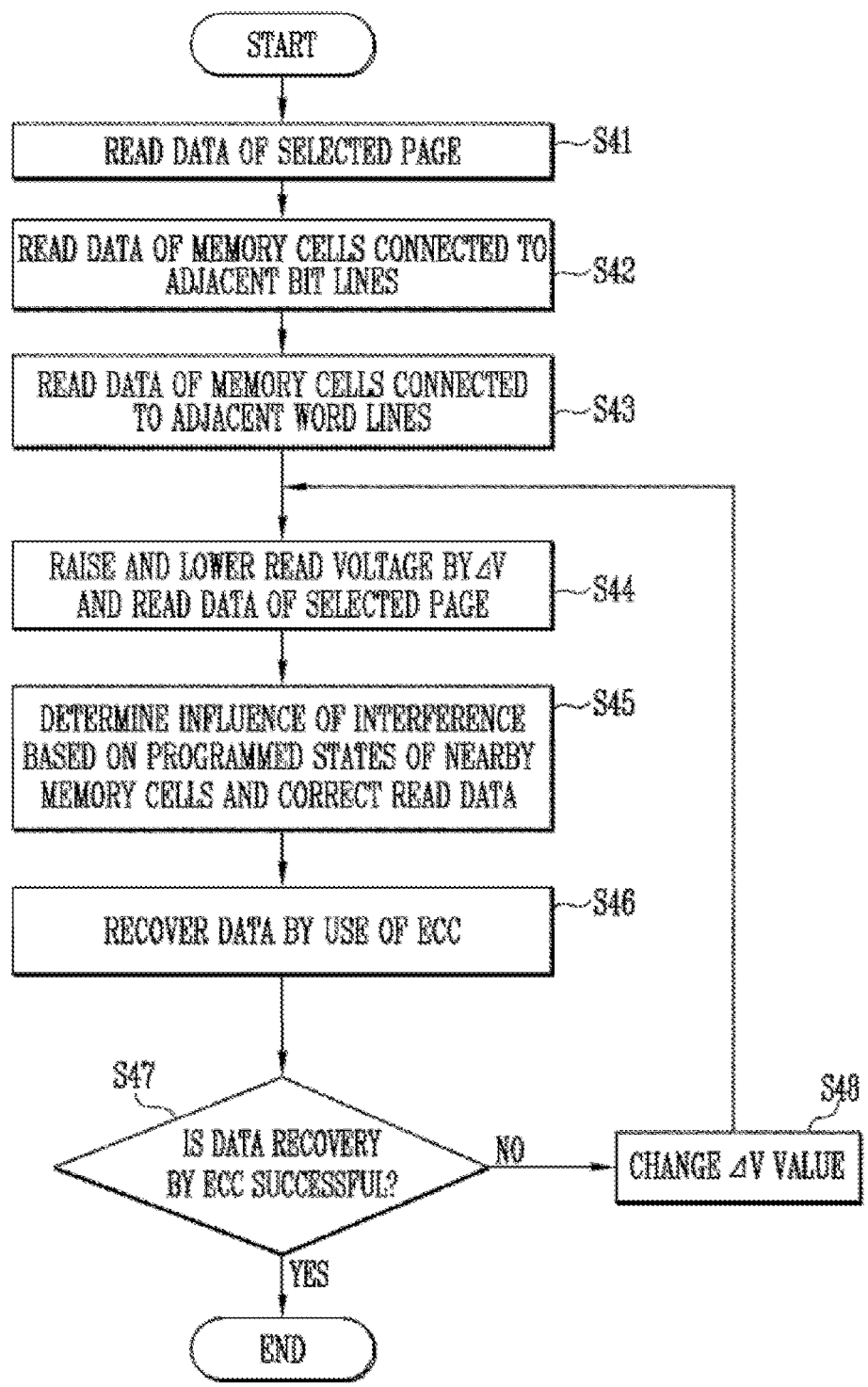
FIG. 4 is a flowchart illustrating an operating method of a memory system according to the present invention.

FIG. 4 is a flowchart illustrating an operating method of a memory system according to the present invention.

Figure 5:
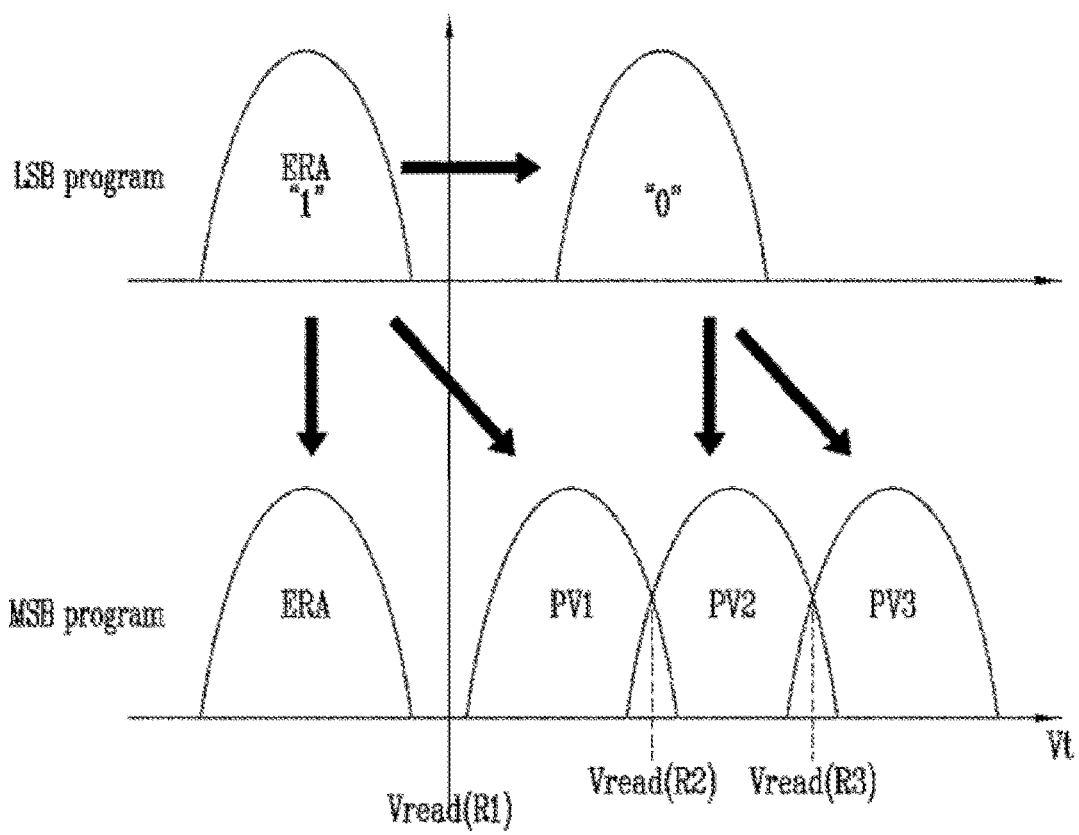
FIG. 5 is a view illustrating threshold voltage distributions, which describes the amount of interference according to programmed states of nearby memory cells.

FIG. 5 is a view illustrating threshold voltage distributions describing the amount of interference according to programmed states of nearby memory cells.

Figure 6:
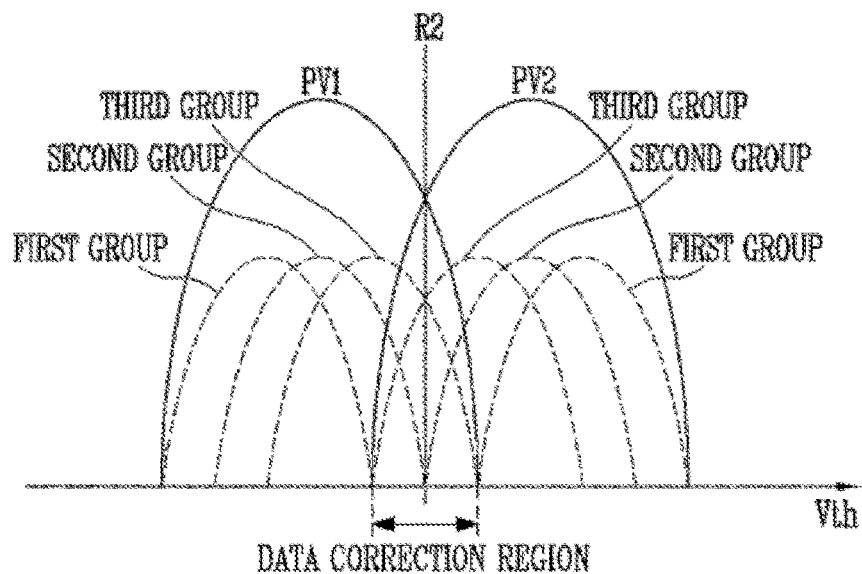
FIG. 6 is a view illustrating threshold voltage distributions of a first programmed state PV1 and a second programmed state PV2, which describes a data correction region during a read operation.

FIG. 6 is a view illustrating threshold voltage distributions of a first programmed state PV1 and a second programmed state PV2, which describes a data correction region during a read operation.

A read operation of the memory system according to the present invention is described with reference to FIGS. 2 to 6.

1) Read Data of Selected Page (S41)

When a read command is input from the host, the controller 200 transmits a command CMD corresponding to the read command to the control logic 140. The control logic 140, in response to the command CMD, controls the voltage generation unit 150 to output a read voltage Vread and a pass voltage Vpass, and controls the address decoder 120 to apply the read voltage Vread to a word line selected among a plurality of word lines WL in response to an address ADDR. In addition, the control logic 140 controls the page buffers PB1 to PBm of the read and write circuit 130 to read data of a selected page and output the read data to the controller 200. The selected page is an even page or an odd page that is electrically coupled to the selected word line among the plurality of word lines WL.

2) Read Data of Memory Cells Electrically Coupled to Adjacent Bit Lines (S42)

The controller 200 controls the control logic 140 to read data of memory cells that are adjacent to memory cells of the selected page in a bit-line-to-bit-line direction. That is, in a case that the selected page is an even page, the controller 200 reads data of memory cells included in an odd page sharing the same word line with the selected page, and outputs the read data to the controller 200.

3) Read Data of Memory Cells Electrically Coupled to Adjacent Word Lines (S43)

The controller 200 controls the control logic 140 to read data of memory cells that are adjacent to memory cells of the selected page in a word-line-to-word-line direction. That is, in a case that the selected page is an even page, the controller 200 reads data of an even page electrically coupled to a word line adjacent to a word line of the selected page, and outputs the read data to the controller 200. In this case, the adjacent word line represents a word line electrically coupled to memory cells that are to be programmed next to the selected memory cells during a programming operation.

4) Raise and Lower the Read Voltage by ΔV and Read Data of the Selected Page (S44)

The control logic 140 controls the voltage generation unit 150 such that an electric potential of the read voltage Vread generated by the voltage generation unit 150 is raised by ΔV, and controls the address decoder 120 to apply the read voltage raised by ΔV to a selected word line among a plurality of word lines WL in response to the address ADDR. In addition, the control logic 140 controls the page buffers PB1 to PBm of the read and write circuit 130 to read data of the selected page and output the read data to the controller 200.

In addition, the control logic 140 controls the voltage generation unit 150 such that the electric potential of the read voltage Vread generated by the voltage generation unit 150 is lowered by ΔV, and controls the address decoder 120 to apply the read voltage lowered by ΔV to a selected word line among a plurality of word lines WL in response to the address ADDR. In addition, the control logic 140 controls the page buffers PB1 to PBm of the read and write circuit 130 to read data of the selected page and output the read data to the controller 200.

That is, the control logic 140 raises the read voltage Vread (for example, R2) by ΔV to read data, and lowers the read voltage Vread by ΔV to read data, to divide memory cells included in a data correction region shown in FIG. 6. The data correction region may be defined as a region in which threshold voltages of two adjacent programmed states (for example, PV1 and PV2) overlap.

5) Correct Read Data by Determining Influence of Interference Depending on Programmed States of Nearby Memory Cells (S45).

Referring to FIG. 5, as for a programming operation of a semiconductor memory device having a multi-level cell, an LSB programming operation is performed and then an MSB programming operation is performed. In a case that a program-completed memory cell may have an increase in a threshold voltage due to interference by a program voltage during a programming operation of nearby memory cells. Accordingly, the threshold voltage distributions may overlap at a second read voltage Vread (R2) and a third read voltage Vread (R3).

In addition, an operation of programming from an erased state (ERA, "1") to a first programmed state PV1, and an operation of programming from a state "0" to a third programmed state PV3 have a greatest shift in a threshold voltage of a memory cell, which causes great interference to nearby memory cells. On the other hand, an operation of programming from an erased state (ERA, "1") to an erased state (ERA) and an operation of programming from a state "0" to a second programmed state PV2 have a relatively small shift in a threshold voltage of a memory cell, which causes insignificant interference to nearby memory cells. In this case, the erased state ERA corresponds to data "11," and the PV1, PV2, and PV3 correspond to "01," "00," and "10," respectively.

Accordingly, depending on programmed states of nearby memory cells, particularly, two memory cells adjacent to a selected memory cell in a bit-line-to-bit-line direction and a memory cell adjacent to the selected memory cell in a word-line-to-word-line direction and programmed next to the selected memory cell in a programming operation, the amount of change in a threshold voltage of the selected memory cell as a result of the interference can be predicted.

For example, in a case a nearby memory cell has a programmed state of PV1 or PV3 having relatively great interference, a threshold voltage distribution of a selected memory cell is shifted to the right side the most due to the interference, and in a case a nearby memory cell has an erased state or programmed state of PV2 having relatively small interference, a threshold voltage distribution of a selected memory cell is hardly shifted or makes no shift.

Based on the above described programmed states of nearby memory cells, the memory cells may be grouped into a first group having a relatively small shift in the threshold voltage distribution, a third group having a relatively large shift in the threshold voltage distribution, and a second group having a medium level shift in the threshold voltage distribution. In this case, the third group may be grouped to include memory cells included in a data correction region.

After the influence of interference is determined based on the programmed states of the nearby memory cells, the data of the selected page read in operation S41 is corrected. A method of correcting data is achieved by inversing read data of memory cells included in a data correction region among memory cells determined to have a relatively large shift in the threshold voltage distribution and thus grouped in the third group among selected memory cells. In more detail, as for memory cells programmed in a PV1 state, read data of memory cells determined to have a voltage larger than a read voltage R2 within the data correction region among memory cells included in the third group is inversed for correction, and as for memory cells programmed in a PV2 state, read data of memory cells determined to have a voltage smaller than a read voltage R2 within the data correction region among memory cells included in the third group is inversed for correction.

Although the above described data correction operation is illustrated in relation to an LSB data read operation in which a PV1 state and a PV2 state are divided, the same method may be applied to data correction on an MSB data read operation in which an erased state, a PV1 state, a PV2 state, and a PV3 state are divided by use of a read voltage Vread (R1) and a read voltage Vread (R3).

6) Recover Data by Use of Error Correcting Code (ECC) (S46)

The controller 200 performs a data recovery operation on the data of the selected page corrected in operation S45, by use of the error correction block 230.

7) Determine Result of ECC Processing (S47)

If determined from the ECC processing that no data has errors or if data having errors is correctable, an error is corrected and a final read data is output.

8) Change $\Delta V$ Value (S48)

If determined from the ECC processing that the number of pieces of data having errors exceeds an ECC processing allowable value, $\Delta V$ is changed, and an operation mode returns to operation S44 and the following operations are repeated. In this case, the number of repetitions is counted and if the counted number is larger than an allowable value, the read operation is processed as failure.

Figure 7:
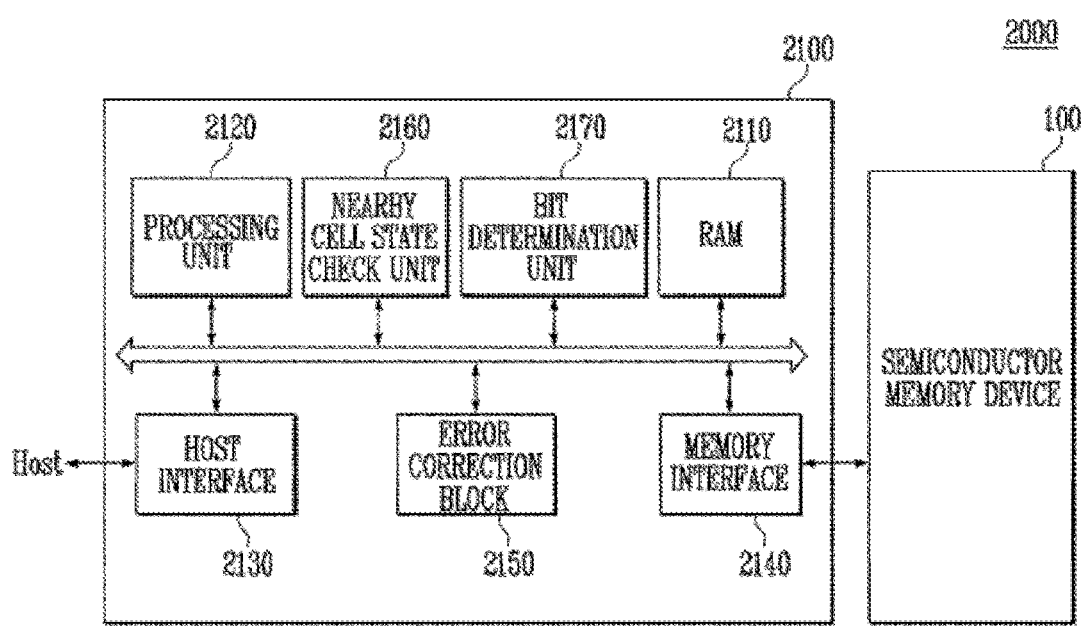
FIG. 7 is a block diagram illustrating a memory system including the semiconductor memory device of FIG. 2.

FIG. 7 is a block diagram illustrating a memory system having a configuration extending from the memory system of FIG. 2.

Referring to FIG. 7, a memory system 2000 includes a semiconductor memory device 100 and a controller 2100.

The semiconductor memory device 100 is configured and operates in the same manner as described above with reference to FIG. 3. Herein, detailed description identical to that of the previous description will be omitted.

The controller 2100 includes the function of the controller 200 described with reference to FIG. 2. The controller 2100 is electrically coupled to a host and the semiconductor memory device 100. The controller 2100 is configured to access the semiconductor memory device 100 in response to a request from the host. For example, the controller 2100 is configured to control a read operation, a write operation, an erase operation, and a background operation of the semiconductor memory device 100. The controller 2100 is configured to provide an interface between the semiconductor memory device 100 and the host. The controller 2100 is configured to drive firmware for controlling the semiconductor memory device 100.

The controller 2100 includes a random access memory (RAM) 2110, a processing unit 2120, a host interface 2130, a memory interface 2140, an error correction block 2150, a nearby cell state check unit 2160, and a bit determination unit 2170. The RAM 2110 is used as at least one of an operating memory of the processing unit 2120, a cache memory between the semiconductor memory device 100 and the host, and a buffer memory between the semiconductor memory device 100 and the host. The processing unit 2120 controls an overall operation of the controller 2100. In addition, the controller 2100 may temporarily store program data provided from the host during a write operation.

The host interface 2130 includes a protocol for performing data exchange between the host and the controller 2100. For example, the controller 2100 is configured to communicate with the host through at least one of a Universal Serial Bus (USB) protocol, a multimedia card (MMC) protocol, a peripheral component interconnection (PCI) protocol, a PCI-express (PCI-E) protocol, an Advanced Technology Attachment (ATA) protocol, a Serial-ATA protocol, a Parallel-ATA protocol, a small computer small interface (SCSI) protocol, an enhanced small disk interface (ESDI) protocol, an Integrated Drive Electronics (IDE) protocol, and a private protocol.

The memory interface 2140 performs interfacing with the semiconductor memory device 100. For example, the memory interface includes a NAND interface or a NOR interface.

The error correction block 2150 performs the same function as that of the error correction block 230 of FIG. 2. The error correction block 2150 is configured to detect and correct an error of data received from the bit determination unit 2170 by use of an error correcting code ECC. In other words, data read from selected memory cells that is corrected is recovered by use of the error correcting code ECC. The processing unit 2120 adjusts a read voltage based on the result of error detection from the error correction block 2150, and controls the semiconductor memory device 100 to perform re-reading. As an embodiment of the present invention, the error correction block 2150 may be provided as a component of the controller 2100.

The nearby cell state check unit 2160 and the bit determination unit 2170 perform the same functions of the nearby cell state check unit 210 and the bit determination unit 220 of FIG. 2. The nearby cell state check unit 2160 temporarily stores data of nearby memory cells received from the semiconductor memory device 100, analyzes the amount of interference of selected memory cells based on the stored data, and groups the selected memory cells into a plurality of groups according to the amounts of interference. The bit determination unit 2170 selects one group determined to have a great amount of interference among the plurality of groups grouped by the nearby cell state check unit 2160, and inverses read data of memory cells whose threshold voltages are included in a data correction region among memory cell included in the selected group, thereby correcting the data. In addition, a data correction operation on the remaining memory cells except the selected group is skipped.

The controller 2100 and the semiconductor memory device 100 may be integrated into a single semiconductor device. According to an embodiment of the present invention, the controller 2100 and the semiconductor memory device 100 may be integrated into a single semiconductor device so as to form a memory card. For example, the controller 2100 and the semiconductor memory device 100 may be integrated into a single semiconductor device so as to form a memory card, such as a personal computer memory card international association (PCMCIA) card, a compact flash card (CF), a smart media card (SM, SMC), a memory stick, a multimedia card (MMC, RS-MMC, MMCmicro), a secure digital card (SD, miniSD, microSD, SDHC), and a universal flash storage device (UFS).

The controller 2100 and the semiconductor memory device 100 may be integrated into a single semiconductor device so as to form a semiconductor drive, that is, a solid state drive (SSD). The semiconductor drive SSD includes a storage device configured to store data in a semiconductor memory. According to an example in which the memory system 2000 is used as the semiconductor drive (SDD), the operating speed of the host electrically coupled to the memory system 2000 may be remarkably improved.

According to another example, the memory system 2000 may be provided as one of various components of electronic devices, such as a computer, a Ultra Mobile PC (UMPC), a workstation, a netbook, a Personal Digital Assistants (PDA), a portable computer, a web tablet, a wireless phone, a mobile phone, a smartphone, an e-book, a portable multimedia player (PMP), a portable game console, a navigation device, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices forming a home network, one of various electronic devices forming a computer network, one of various electronic devices forming a telematics network, an RFID device, and one of various parts forming a computing system.

According to an embodiment of the present invention, the semiconductor memory device 100 or the memory system 2000 may be mounted in various forms of packages. For example, the semiconductor memory device 100 or the memory system 2000 may be packaged and mounted in various forms, such as PoP (Package on Package), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), System In Package (SIP), Multi Chip Package (MCP), Wafer-level Fabricated Package (WFP), and Wafer-Level Processed Stack Package (WSP).

Figure 8:
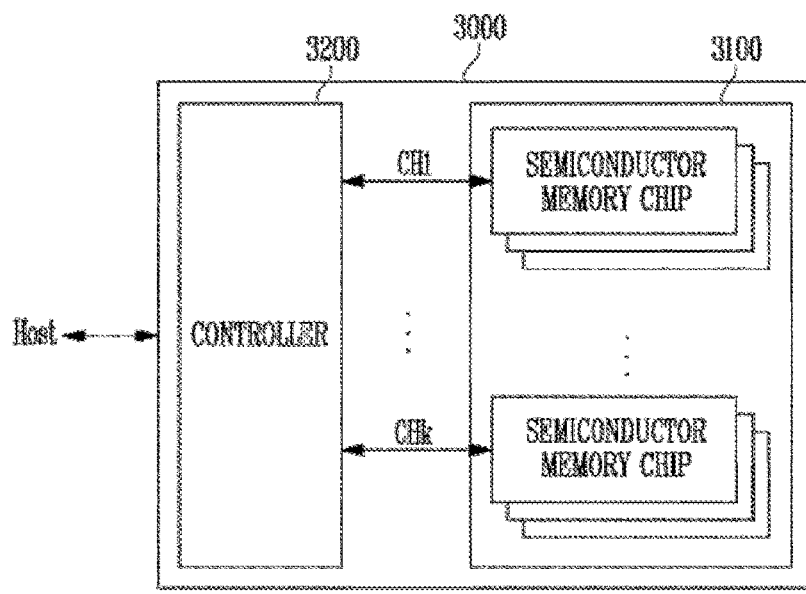
FIG. 8 is a block diagram illustrating an example of application of the memory system of FIG. 7.

FIG. 8 is a block diagram illustrating an example of application 3000 of the memory system 2000 of FIG. 7.

Referring to FIG. 8, the memory system 3000 includes a semiconductor memory device 3100 and a controller 3200. The semiconductor memory device 3100 includes a plurality of semiconductor memory chips. The plurality of semiconductor memory chips are divided into a plurality of groups.

In FIG. 8, the plurality of groups are illustrated as communicating with the controller 3200 through a first channel to a $k^{th}$ channel CH1 to CHK, respectively. Each of the semiconductor memory chips may be configured and operate in the same manner as the semiconductor memory device 100 described above with reference to FIG. 1.

Each group is configured to communicate with the controller 3200 through a single common channel. The controller 3200 is configured in the same manner as the controller 2100 described above with reference to FIG. 7, and controls the plurality of memory chips of the semiconductor memory device 3100 through the plurality of channels CH1 to CHK.

Although, in FIG. 8, a plurality of semiconductor memory chips are illustrated as being electrically coupled to a single channel, the present invention is not limited thereto. For example, modification of the memory system 3000 may be made such that a single semiconductor memory chip is electrically coupled to a single channel.

Figure 9:
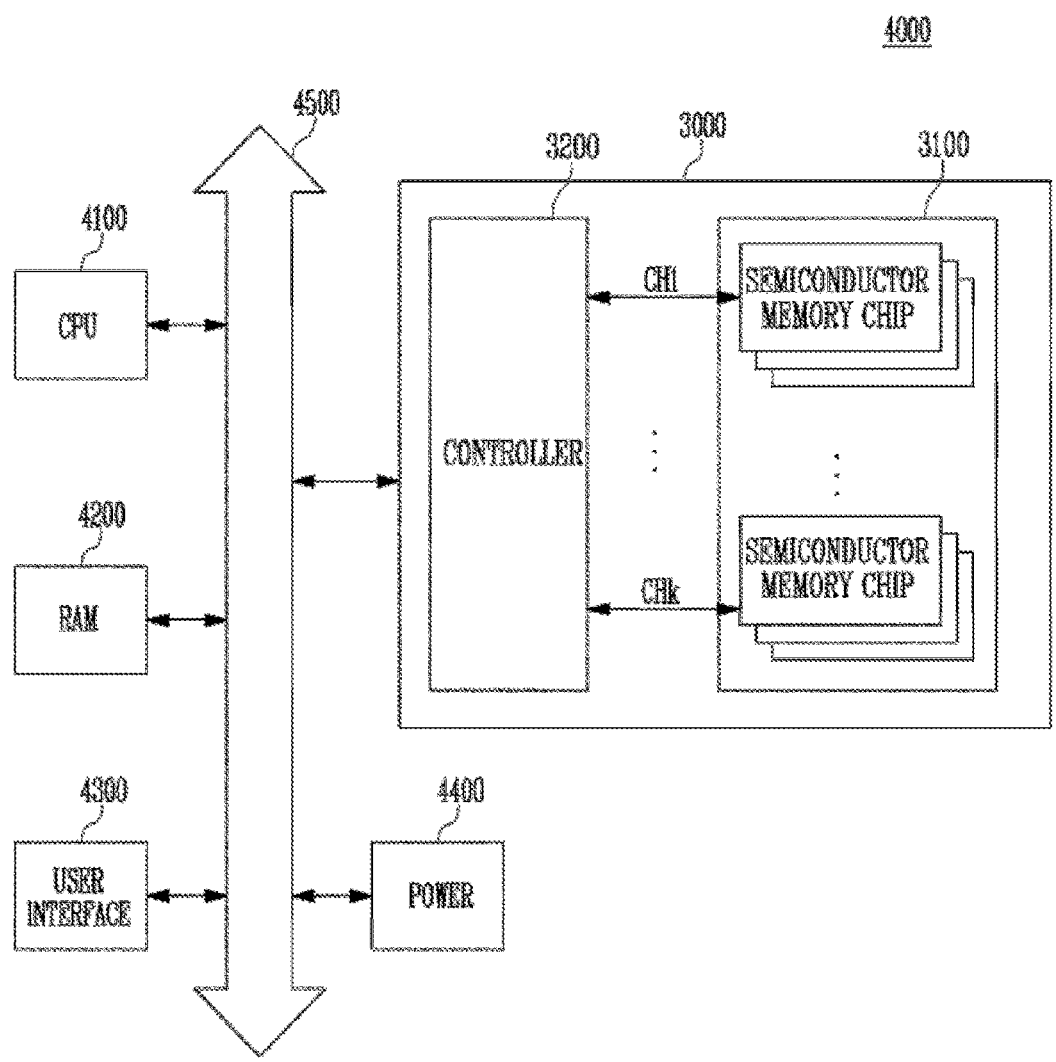
FIG. 9 is a block diagram illustrating a computing system including the memory system described with reference to FIG. 8.

FIG. 9 is a block diagram illustrating a computing system 4000 including the memory system 3000 illustrated with reference to FIG. 8.

Referring to FIG. 9, the computing system 4000 includes a central processing unit (CPU) 4100, a random access memory (RAM) 4200, a user interface 4300, a power 4400, a system bus 4500, and the memory system 3000.

The memory system 3000 is electrically coupled to the central processing unit 4100, the RAM 4200, the user interface 4300, and the power 4400 through the system bus 4500. Data provided through the user interface 4300 or processed by the CPU 4100 are stored in the memory system 3000.

Although the semiconductor memory device 3100 in FIG. 9 is illustrated as being electrically coupled to the system bus 4500 through the controller 3200, the present invention is not limited thereto. For example, the semiconductor memory device 3100 may be directly electrically coupled to the system bus 4500. In this case, the function of the controller 3200 may be performed by the CPU 4100 and the RAM 4200.

Although the memory system 3000 shown in FIG. 9 is provided as the illustration of FIG. 8, the present invention is not limited thereto. For example, the memory system 3000 may be substituted with the memory system 2000 shown in FIG. 7. According to an embodiment of the present invention, the computing system 4000 may include both the memory systems 2000 and 3000 described with reference to FIGS. 7 and 8.

According to the present invention, interference characteristics of selected memory cells are determined based on data programmed in nearby memory cells, and data read from the selected memory cells is corrected based on the interference characteristics, so that accurate date is read.

In the drawings and specification, there have been disclosed typical embodiments of the invention, and although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A memory system comprising:
   a semiconductor memory device configured to perform a read operation; and
   a controller configured to control the read operation of the semiconductor memory device,
   wherein the controller, by determining programmed states of memory cells located nearby selected memory cells, divides the selected memory cells into a plurality of groups depending on an amount of interference, and corrects data of one of the groups having a great amount of interference.

2. The memory system of claim 1, wherein the semiconductor memory device comprises:
   a memory cell array including a plurality of memory cells;
   a periphery circuit unit configured to read data of the selected memory cells and data of the nearby memory cells, and transmit the read data to the controller; and
   a control logic configured to control the periphery circuit unit to perform the read operation according to control of the controller.

3. The memory system of claim 1, wherein the nearby memory cells include memory cells adjacent to the selected memory cells in a bit-line-to-bit-line direction and a memory cell that is adjacent to the selected memory cells in a word-line-to-word-line direction and is to be programmed next to the selected memory cells.

4. The memory system of claim 1, wherein the semiconductor memory device, during the read operation, reads data of the selected memory cells by use of a read voltage and transmits the read data to the controller, and after changing the read voltage by an amount corresponding to a data correction region, reads again the data of the selected memory cells and transmits the re-read data to the controller.

5. The memory system of claim 1, wherein the data correction region is a threshold voltage distribution in which two adjacent programmed states overlap.

6. The memory system of claim 4, wherein the one of the groups having a great amount of interference includes the data correction region.

7. The memory system of claim 4, wherein the correcting of the data of the one group having a great amount of interference represents inversing data of memory cells included in the data correction region among memory cells in the one group having a great amount of interference.

8. The memory system of claim 1, wherein among an erased state, a first programmed state PV1, a second programmed state PV2, and a third programmed state PV3 of the nearby memory cells arranged by threshold voltage distributions, the selected memory cells have a great amount of interference at the first programmed state PV1 or the third programmed state PV3, and have a small amount of interference at the erased state and the second programmed state PV2.

9. The memory system of claim 4, wherein the periphery circuit unit comprises:
a voltage generation unit configured to generate the read voltage; and
page buffers configured to read data of the nearby memory cells and transmit the read data to the controller,
wherein the voltage generation unit changes the read voltage to a value of the data correction region by raising and lowering the read voltage according to control of the control logic.

10. A memory system comprising:
a memory cell array including a plurality of memory cells;
a periphery circuit unit configured to read data stored in the plurality of memory cells; and
a controller configured to correct data read from selected memory cells based on data of nearby memory cells by inversing data of memory cells having a great amount of interference.

11. The memory system of claim 10, wherein the controller divides the plurality of memory cells into a plurality of groups based on the data of the nearby memory cells.

12. The memory system of claim 11, wherein the controller corrects data of one group determined to have a great amount of interference caused by the nearby memory cells among the plurality of groups.

13. The memory system of claim 10, wherein the nearby memory cells include memory cells adjacent to the selected memory cells in a bit-line-to-bit-line direction and a memory cell that is adjacent to the selected memory cells in a word-line-to-word-line direction and is to be programmed next to the selected memory cells.

14. The memory system of claim 10, wherein the periphery circuit unit reads data of the selected memory cells by use of a read voltage and transmits the read data to the controller, and after changing the read voltage by an amount corresponding to a data correction region, reads again the data of the selected memory cells and transmits the re-read data to the controller.

15. The memory system of claim 14, wherein the data correction region is a threshold voltage distribution in which two adjacent programmed states overlap.

16. The memory system of claim 14, wherein the one of the groups having a great amount of interference includes the data correction region.

17. The memory system of claim 14, wherein the correcting of the data of the one group having a great amount of interference represents inversing data of memory cells included in the data correction region among memory cells in the one group having a great amount of interference.

18. A method of operating a memory system, the method comprising:
reading data of selected memory cells;
reading data of nearby memory cells adjacent to the selected memory cells;
dividing the selected memory cells into a plurality of groups based on the data of the nearby memory cells;
dividing memory cells included in a data correction region; and
correcting data read from memory cells included in the data correction region by inversing data of the memory cells included in the data correction region and determined to have a greatest amount of interference caused by the nearby memory cells.

19. The method of claim 18, wherein the data correction region is a threshold voltage distribution in which two adjacent programmed states overlap.

20. The method of claim 18, wherein data read from the selected memory cells that is corrected is recovered by use of an error correcting code.

* * * * *